3,176,354
METHOD OF APPLYING A FREE FLOWING INSULATING FILL MATERIAL
Theodore N. Blau, Irvington, and Sidney Speil, Somerville, N.J., assignors to Johns-Manville Corporation, New York, N.Y., a corporation of New York
No Drawing. Filed Mar. 25, 1960, Ser. No. 17,469
10 Claims. (Cl. 20—101)

This invention relates generally to a method of handling free flowing insulating powders or products of low bulk density. More particularly the invention is directed to the densification of very low bulk density, fluid-like powdered insulating materials or particulate products thereof and an improved means or method of conveying, applying and compacting the same.

Loose fill thermal insulating materials such as sawdust, granulated cork, asbestos, cellulose fibers, mineral or glass wool, etc., and techniques of applying or installing such materials and fabricating insulating constructions utilizing the same are common in the art. However, conventional means for the application or installation of common loose bulk fill insulating materials, such, for example, as mechanical or pneumatic pressure for conveying and compressing the same, have proven unsatisfactory in handling and effectively applying powdered insulations or products thereof having very low bulk densities in the vicinity of about 5 pounds per cubic foot. These very low bulk density powders, such as the aerogels and the like finely divided materials, cannot be uniformly and effectively compacted or densified by mechanical or pneumatic pressure because of their light weight and inherent free flowing fluid nature.

It is accordingly a primary object of this invention to provide an improved and effective means of applying or conveying and densifying low bulk density, free flowing powdered insulating fill materials which are normally too light in weight to be effectively conducted through small openings and compacted without substantially diminishing or deleteriously affecting their thermal insulating or other desirable properties thereof.

Another object of this invention is to provide a method which enables complete and uniform void-free filling of the cavity or interior of a retaining casing or other hollow member through a small orifice(s) and the controlled and uniform densification of the fill.

A further object of this invention is to provide an economical and effective means of reversibly converting loose, low bulk density, free flowing powders, or mixtures comprising the same, into compactible form and/or means of imparting "tack" or cohesive properties thereto rendering the same capable of mechanical or pneumatic tamping to achieve high density without destroying their essentially particulate form which enables such materials to be poured or otherwise conducted into or through small orifices and to readily flow throughout the cavity.

A still further object of this invention is to provide an effective means of controlling the ultimate density of applied or installed loose fill insulations or fills whereby powders having initial bulk densities of less than about 10 pounds per cubic foot may be applied in amount to result in filled insulations of 20 to 30 pounds per cubic foot.

A particular object of this invention is to achieve loose bulk fill insulating powders or particulate products which when applied and consolidated to densities up to about 25 pounds per cubic foot have thermal conductivities essentially the same as or less than that of still air at equivalent temperatures.

This invention will be more fully understood and further objects and advantages thereof will become apparent from the hereinafter more detailed description and specific examples.

It has been found that loose, free flowing powdered insulating materials such as aerogels or products incorporating the same which are too light in weight and fluid-like to be effectively handled and/or compacted by mechanical, pneumatic and the like means can be effectively and reversibly converted to a compactible form, without deleterious effects, by combining or incorporating therewith non-polar liquid hydrocarbons. Once reduced to a compactible form according to this invention, such low bulk density, fluid-like free flowing powders may be effectively handled and/or applied either mechanically or pneumatically and the ultimate density of the loose fill insulation may be precisely controlled.

Conversion of these lightweight free-flowing powders, or particulate insulating products comprising the same, to handleable and/or compactible form is effectively achieved by combining the same with the non-polar liquid hydrocarbons, while blending to promote uniformity of the components, to incorporate the oily liquid hydrocarbons within, on or about the mass of the powder or particulate insulating product(s). This treatment appears to result in the sorption (i.e., absorption and/or adsorption) of the liquid in and about the minute particles and/or the interstitial voids or pores of the finely divided powder. The conversion procedure is accordingly facilitated, and the degree of uniformity of the resulting insulation improved, through the gradual addition of one component to the other accompanied by continuous blending or mixing to promote substantial homogeneity of the combination and, in turn, of its "wet density." A preferred procedure or technique comprises sifting the dry powder into the oily liquid accompanied by continuous stirring until a "crumbly" powder of substantially uniform particle size is produced.

The conversion procedure or technique of this invention is directed to and has been found to have specific application to free flowing insulating powders with an ultimate structural unit having an average effective pore space between the smallest of said structural units of the same order of magnitude as the means free path of the molecules comprising air at 150° F. and atmospheric pressure, and dry bulk density in the vicinity of approximately 5 pounds per cubic foot, e.g., no more than about 10 pounds per cubic foot, or particulate insulating products comprising a substantial proportion of such fine material. Typical finely divided, i.e., having an average ultimate particle diameter finer than 100 millimicrons, free flowing insulating powders of the foregoing structure which exhibit fluid-like handling characteristics comprise the aerogel products described in United States Letters Patent No. 2,093,454 to Kistler, very fine grades of channel type carbon black, and certain pyrogenic colloidal silica products such as those supplied under the trademark of Cab-O-Sil, a product of Godfrey L. Cabot, Inc.

Particulate insulating products incorporating substantial or effective proportions (i.e., at least 45% by weight and preferably from 60 to 90% by weight) of such finely divided free flowing powders and which in turn exhibit fluid-like characteristics wherein the methods or techniques of this invention are likewise applicable include those which comprise, in addition to one or more of the foregoing insulating powders, finely divided opacifying material(s), binders, and possibly fibrous reinforcing material. Appropriate opacifying material(s) include finely divided radiation reflective or absorptive materials such as metallic aluminum, or silicon powder; radiation absorbing materials such as carbon black or pigments such as illmenite, manganese oxide or chromium oxide;

or radiation scattering materials such as zircon, titanium dioxide and the like materials with a high index of refraction in the infra red. These opacifiers may be incorporated in amount up to 45% by weight, preferably about 5 to 45%, depending upon the temperature conditions contemplated.

Where appropriate or desired, the binder component may comprise conventional particulate binders, either organic or inorganic, which may be conveniently and effectively cured, or the cure completed, in situ. Binders may be utilized in proportions of from 0.5% up to about 15% by weight and include thermosetting or catalyst activated organic resins such as the common phenol formaldehyde condensation products and related resins, thermoplastic organic resins, and inorganic binders such as low temperature fusing glasses or enamels.

Fibrous reinforcing material such as asbestos, glass or the like mineral fibers, etc., normally comprise an undesirable component in the loose fill insulations because of their tendency to impede handling or application, particularly wherein the insulation must be introduced through a small orifice. Moreover, reinforcing material is not necessary with most loose fill insulations which are encased or sheathed within a retaining and supporting structure. Nevetheless, the incoporation of reinforcing fibers of appropriate dimensions and in quantities of about 5%, or up to approximately 15% by weight, in addition to a suitable binder, in the hereinbefore described loose fill insulating products is within the scope of this invention, depending, of course, upon the type and nature of the particular installation.

Exemplary insulating products or compositions, comprising one or more of the foregoing components combined with finely divided low density insulating powder, the use or application of which are enhanced by this invention comprise those disclosed in United States Letters Patent No. 2,811,457 to Speil et al. and in pending application Serial No. 797,872, filed February 12, 1959, now abandoned, in the name of Barnett et al.

As indicated hereinbefore, the densifying liquid consists of non-polar liquid hydrocarbons comprising, for example, the higher boiling petroleum fractions consisting of kerosene or other middle oils such as common fuel oils, heavy oils, heptane, benzene and the like organic liquids having a boiling point of at least about 75° C. Non-polar liquids of relatively low vapor pressures such as petroleum ether, gasoline, etc., are normally too volatile to permit effective handling and control of density, and substantially increase the potential fire hazard. Polar liquids such as water, alcohol and the like, being disposed to wet surrounding materials, are to be avoided because of their deleterious or destructive effects upon the essential structure of low bulk density powders such as aerogels. Water, for instance, will convert an aerogel to an aquagel upon contact and the latter is relatively ineffective as a thermal insulation. Moreover, it is essential that the densifying liquid be of such a nature as to impart "tack" or "body" to the free flowing powder to enable uniform densification by tamping or the like application of pressure.

In addition to enabling effective application and/or densification of these otherwise unmanageable materials by common mechanical or pneumatic means, the present invention also provides for positive control over the density of the applied insulating fill. Inasmuch as the contemplated low bulk density insulating powders such as the aerogels are highly porous, comprising approximately 75 to 95% voids, and thus are capable of picking up and retaining quantities of liquid several times their weight, the ultimate density of the applied or dried insulating fill can be varied and controlled by predetermining and regulating the amount of dry insulating material in the combined liquid-solids mix. Thus, the amount of the densifying liquid component should be approximately equivalent to the volume of the cavity or interior of the retaining casing or object to be filled with insulation, less the approximate volume of the solids, and the amount of powdered insulation or particulate insulating product thereof should be adequate to provide sufficient dry insulating material to result in the density desired in the ultimate product or fill. For example, wherein the interior or cavity of the retaining casing or object to be filled is of a specific volume, say 1 cubic foot as a matter of convenience, then the volume of the densifying liquid comprising approximately 1 cubic foot, less the volume of solids, is combined with 10 pounds of aerogel (approximately 0.06 cubic foot) or the like insulating material to obtain approximately 10 pounds per cubic foot density fill insulation, or 15 pounds of insulation to obtain a 15 pound per cubic foot density fill insulation, or other amounts equivalent to the density desired.

The bulk density and in turn the porosity of free flowing insulating powders of the nature contemplated being such as to enable their taking up or sorbing liquids in amounts many times their own weight, the ratios of densifying liquid to insulating solids for the application of fill insulation of typical and effective densities ranging from approximately 7 to 30 pounds for example, comprise approximately 8 to 1½ parts by weight of liquid per part by weight of solid insulating material. These ratios are dependent, of course, upon the specific gravity of the particular liquid hydrocarbons utilized, and may therefore vary to a substantial degree. Nevertheless, because of the very high porosity and in turn sorptive capacity of the typical insulating materials contemplated, the densified insulating products of this invention, consisting of liquid and solid components combined in the foregoing ratios, normally comprise flowable, discrete particulate solids which become tacky or dough-like when consolidated. However, in addition to liquid-solid combinations of an apparently "dry" and discrete nature, this invention also contemplates blends of solid insulation and densifying liquid which consist of tacky or gummy masses of the components with inbetween flow properties which may be effectively handled or applied and consolidated by conventional mechanical, pneumatic, or the like techniques.

The hereinafter examples illustrate the improved technique of reversibly converting to a compactible form and applying lightweight fluid-like insulations and the efficiency of insulations so treated. It is to be understood that the compositions of the particular insulating fill materials or products and of the non-polar liquid hydrocarbons, and the relative proportions thereof, set forth in these examples are all exemplary and not to be construed to limit the novel method or means of this invention to any specific compositions, products or techniques recited in these examples, other than the novel method or procedure of reversibly reducing fluid-like powder insulations or products thereof to a compactible form and/or imparting tack and coherency thereto by combining the same with a non-polar hydrocarbon liquid and subsequently removing said liquid.

*Example 1*

A free flowing powder insulation consisting of 54.6% by weight of finely divided pyrogenic colloidal silica (Cab-O-Sil) and 45.4% by weight of milled zircon opacifying material and exhibiting a dry bulk density of approximately 10 pounds per cubic foot was thoroughly blended with No. 2 fuel oil in the proportions of 36.5 parts by weight of solids and 63.5 parts by weight of oil. Blending was effected by sifting the dry silica and zircon powder into the oil accompanied by continuous stirring and resulted in a crumbly particulate mass which was tacky and dough-like when squeezed between the fingers. A double walled jet fuel nozzle forming an annular cavity of an approximate volume of 10 cc. and provided with two ½" diameter orifices through the outer wall was insulated with the foregoing densified insulation as follows: An increment of the foregoing densified insulation was poured into the nozzle through one of the ½" openings, vibrated for three seconds with a low amplitude, 60-cycle electric vibrator and then tamped with a 1/16" diameter wire inserted through the adjacent opening. This procedure was continued with small increments of densified insulation until the nozzle was completely filled with sufficient insulation to provide a density of 25 pounds per cubic foot on a dry basis. Upon drying at 350° F. for 24 hours, the densifying oil was substantially completely removed and with no discernible shrinkage, and the density of the fill insulation was approximately 25 pounds per cubic foot. The thermal conductivity of the thus treated insulating material was 0.33 B.t.u./in./hr./sq. ft./° F. at 820° F. compared to a value of 0.37 for free air.

*Example II*

A fluid-like particulate insulating product comprising 51% by weight silica aerogel, 43% by weight of finely divided zircon opacifier, and 6% by weight of powdered phenol formaldehyde resin was densified by slowly adding 34.5 parts by weight thereof to 65.5 parts by weight of No. 2 fuel oil accompanied by mixing. The resulting particulate mass was readily flowable but exhibited sufficient tack and cohesive properties upon consolidation to permit effective mechanical compacting. Samples compacted to a density of 16 pounds per cubic foot and exposed to temperatures of approximately 350° F. for a period of 16 hours to cure the thermosetting resin binder to produce a relatively rigid integrated body and remove the densifying oil, exhibited average thermal conductivities of 0.26 B.t.u./in./hr./sq. ft./° F. at 350° F. and 0.35 B.t.u./in./hr./sq. ft./° F. at 820° F. The thermal conductivities of free air at the same temperatures are 0.26 and 0.37 B.t.u./in./hr./sq. ft./° F. respectively.

It should be understood that the present disclosure is for the purpose of illustration only and that this invention includes all modifications and equivalents which fall within the scope of the appended claims.

What we claim is:

1. An improved method of applying particulate insulating fill materials having low bulk densities and fluid-like flow characteristics to the interior cavity of an impervious retaining casing and controlling the applied density of the particulate insulating fill material; the improved method comprising the steps of:

(a) combining particulate solid insulating fill materials of at least one member selected from the group consisting of silica aerogel and pyrogenic colloidal silica having initial dry bulk densities less than about 10 lbs./cu. ft., fluid-like flow characteristics and an ultimate structural unit having an average effective pore space between the smallest of said structural units of the same order of magnitude as the mean free path of the molecules comprising air at 150° F. and atmospheric pressure, with non-polar liquid hydrocarbon having a boiling point of at least approximately 75° F. and thereby providing cohesive particulate solids, said particulate solid insulating fill being combined in amount approximately sufficient to provide the solids density desired in the dry insulating fill and said non-polar liquid hydrocarbon being combined in amount of an approximately equivalent volume of the cavity of the retaining casing less the approximate actual solids volume of the insulating fill materials;

(b) then introducing the cohesive particulate solids comprising the combined low density particulate solid insulating fill materials and non-polar liquid hydrocarbon into the cavity formed by the casing; and, (c) removing the non-polar liquid hydrocarbon by evaporation.

2. The improved method of claim 1 wherein approximately 1 part by weight of said particulate solid insulating fill is combined with the said non-polar liquid hydrocarbon in amount of approximately 1 and ½ to 8 parts by weight.

3. An improved method of applying particulate insulating fill products having low bulk densities and fluid-like flow characteristics to the interior cavity of an impervious retaining casing and controlling the applied density of the particulate insulating fill products; the improved method comprising the steps of:

(a) Combining particulate solid insulating fill products comprising finely divided opacifying material in amount up to 45% by weight and approximately 45 to 90% by weight of at least one member of finely divided free flowing powder selected from the group consisting of silica aerogel and pyrogenic colloidal silica having initial dry bulk densities less than about 10 lbs./cu. ft., fluid-like flow characteristics and an ultimate structural unit having an average effective pore space between the smallest of said structural units of the same order of magnitude as the mean free path of the molecules comprising air at 150° F. and atmospheric pressure, with non-polar liquid hydrocarbon having a boiling point of at least approximately 75° F. and thereby providing cohesive particulate solids, said particulate solid insulating fill being combined in amount approximately sufficient to provide the solids density desired in the applied dry insulating fill and the said non-polar liquid hydrocarbon being combined in amount of an approximately equivalent volume of the cavity of the retaining casing less the approximate actual solids volume of the insulating fill products.

(b) then introducing the cohesive particulate solids comprising the combined low density particulate solid insulating products and non-polar liquid hydrocarbon into the cavity formed by the casing; and, (c) removing the non-polar liquid hydrocarbon by evaporation.

4. The improved method of claim 3 wherein approximately 1 part by weight of said particulate solid insulating fill is combined with the said non-polar liquid hydrocarbon in amount of approximately 1 and ½ to 8 parts by weight.

5. An improved method of applying particulate insulating fill products having low bulk densities and fluid-like flow characteristics to the interior cavity of an impervious retaining casing and controlling the applied density of the particulate insulating fill products; the improved method comprising the steps of:

(a) combining particulate solid insulating fill products comprising finely divided opacifying material in amount up to approximately 45% by weight, binder in amount of approximately 0.5 to 15% by weight, 0 to approximately 15% by weight of reinforcing fiber and approximately 45 to 90% by weight of at least one member of finely divided free flowing powder selected from the group consisting of silica aerogel and pyrogenic colloidal silica having initial dry bulk densities less than about 10 lbs./cu. ft., fluid-like flow characteristics and an ultimate structural unit having an average effective pores pace between the smallest of said structural units of the same order of magnitude as the mean free path of the molecules comprising air at 150° F. and atmospheric pressure, with non-polar liquid hydrocarbon having a boiling point of at least 75° F. and thereby providing cohesive particulate solids, said particulate solid insulating fill being combined in amount approximately sufficient to provide the solids density desired in the applied dry insulating fill and the said non-polar liquid hydrocarbon being combined in amount of an approximately equivalent volume of the cavity of the retaining casing less the approximate actual solids volume of the insulating fill products;

(b) then introducing the cohesive particulate solids comprising the combined low density particulate solid insulating products and non-polar liquid hydrocarbon into the cavity formed by the casing; and, (c) removing the non-polar liquid hydrocarbon by evaporation.

6. The improved method of claim 5 wherein approximately 1 part by weight of said particulate solid insulating fill is combined with the said non-polar liquid hydrocarbon in amount of approximately 1 and ½ to 8 parts by weight.

7. An improved method of applying particulate insulating fill products having low bulk densities and fluid-like flow characteristics to the interior cavity of an impervious retaining casing and controlling the applied density of the particulate insulating fill products; the improved method comprising the steps of:

(a) combining particulate solid insulating fill products having a dry bulk density of less than approximately 15 lbs./cu. ft. and comprising finely divided opacifying material in amount up to approximately 45% by weight and approximately 45 to 90% by weight of at least one member of finely divided free flowing powder selected from the group consisting of silica aerogel and pyrogenic colloidal silica having initial dry bulk densities less than about 10 lbs./cu. ft., fluid-like flow characteristics and an ultimate structural unit having an average effective pore space between the smallest of said structural units of the same order of magnitude as the mean free path of the molecules comprising air at 150° F. and atmospheric pressure, with non-polar liquid hydrocarbon having a boiling point of at least approximately 75° F. and thereby providing cohesive particulate solids, said particulate solid insulating fill being combined in amount approximately sufficient to provide the solids density desired in the applied dry insulating fill and the said non-polar liquid hydrocarbon being combined in amount of an approximately equivalent volume of the cavity of the retaining casing less the approximate actual solids volume of the insulating fill products;

(b) then introducing the cohesive particulate solids comprising the combined low density particulate solid insulating products and non-polar liquid hydrocarbon into the cavity formed by the casing; and (c) removing the non-polar liquid hydrocarbon by evaporation.

8. The improved method of claim 7 wherein approximately 1 part by weight of said particulate solid insulating fill is combined with the said non-polar liquid hydrocarbon in amount of approximately 1 and ½ to 8 parts by weight.

9. An improved method of applying particulate insulating fill products having low bulk densities and fluid-like flow characteristics to the interior cavity of an impervious retaining casing and controlling the applied density of the particulate insulating fill poducts; the improved method comprising the steps of:

(a) combining particulate solid insulating fill products having a dry bulk density of less than approximately 15 lbs./cu. ft. comprising finely divided opacifying material in amount up to approximately 45% by weight, approximately 0.5 to 15% by weight of binder, 0 to approximately 15% by weight of reinforcing fiber and approximately 45 to 90% by weight of at least one member of finely divided free flowing powder selected from the group consisting of silica aerogel and pyrogenic colloidal silica having initial dry bulk densities less than about 10 lbs./cu. ft. fluid-like flow characteristics and an ultimate structural unit having an average effective pore space between the smallest of said structural units of the same order of magnitude as the mean free path of molecules comprising air at 150° F. and atmospheric pressure, with non-polar liquid hydrocarbon having a boiling point of at least approximately 75° F. and thereby providing cohesive particulate solids, said particulate solid insulating fill being combined in amount approximately sufficient to provide the solids density desired in the applied dry insulating fill and the said non-polar liquid hydrocarbon being combined in amount of an approximately equivalent volume of the cavity of the retaining casing less the approximate actual solids volume of the insulating fill products;

(b) then introducing the cohesive particulate solids comprising the combined low density particulate solid insulating product and nonpolar liquid hydrocarbon into the cavity formed by the casing; and, (c) removing non-polar liquid hydrocarbon by evaporation.

10. The improved method of claim 9 wherein approximately 1 part by weight of said particulate solid insulating fill is combined with the said non-polar liquid hydrocarbon in amount of approximately 1 and ½ to 8 parts by weight.

References Cited by the Examiner

UNITED STATES PATENTS

| | | | |
|---|---|---|---|
| 1,307,549 | 6/19 | Headson | 252—62 |
| 2,036,913 | 4/36 | Brown | 252—62 |
| 2,077,094 | 4/37 | Byers | 252—62 |
| 2,093,454 | 9/37 | Kistler | 252—62 |
| 2,120,431 | 6/38 | Stafford | 252—62 |
| 2,128,336 | 8/38 | Torstensson | 20—101 |
| 2,226,617 | 12/40 | Kuenzli | 20—101 |
| 2,356,827 | 8/44 | Coss | 20—101 |
| 2,733,159 | 1/56 | Scoggin | 252—62 X |
| 2,797,201 | 6/57 | Veatch | 252—62 |
| 2,811,457 | 10/57 | Speil et al. | 106—69 |
| 2,888,357 | 5/59 | Pittman | 252—62 |
| 2,978,298 | 4/61 | Wetzel et al. | 252—317 |

FOREIGN PATENTS 549,675  6/57  Canada.

OTHER REFERENCES

Pp. 564, 568, 654, 656, 657 and 841, fifth edition, 1945, Asphalts and Allied Substances, by Abraham.

Pp. 150–154, 251 and 252; 1955; The Colloid Chemistry of Silica and Silicates by Ller, Cornell Univ. Press.

JACOB L. NACKENOFF, *Primary Examiner.*

WILLIAM I. MUSHAKE, *Examiner.*

UNITED STATES PATENT OFFICE
CERTIFICATE OF CORRECTION

Patent No. 3,176,354                            April 6, 1965

Theodore N. Blau et al.

It is hereby certified that error appears in the above numbered patent requiring correction and that the said Letters Patent should read as corrected below.

Column 2, lines 53 and 54, strike out "very fine grades of channel type carbon black,".

Signed and sealed this 30th day of November 1965.

(SEAL)
Attest:

ERNEST W. SWIDER                            EDWARD J. BRENNER
Attesting Officer                                Commissioner of Patents